United States Patent
Mödinger et al.

[11] Patent Number: 5,931,485
[45] Date of Patent: Aug. 3, 1999

[54] SUPPORT ARRANGEMENT FOR A STEERED VEHICLE WHEEL

[75] Inventors: Wolfgang Mödinger, Weinstadt; Thomas Schneider, Remseck; Bernhard Lehmann, Stuttgart, all of Germany

[73] Assignee: Daimler Benz AG, Stuttgart, Germany

[21] Appl. No.: 08/899,915

[22] Filed: Jul. 24, 1997

[30] Foreign Application Priority Data

Jul. 25, 1996 [DE] Germany .................. 196 30 013

[51] Int. Cl.⁶ .................................. B62D 17/00
[52] U.S. Cl. ........................ 280/86.751; 280/86.75; 280/93.512
[58] Field of Search .................... 280/86.75, 86.751, 280/86.754, 86.758, 124.125, 93.512

[56] References Cited

FOREIGN PATENT DOCUMENTS

| | | |
|---|---|---|
| 0 092 066 | 10/1983 | European Pat. Off. . |
| 1 415 283 | 1/1965 | France . |
| 1 566 066 | 3/1969 | France . |
| 1 278 261 | 9/1968 | Germany . |
| 1 630 290 | 6/1971 | Germany . |
| 2 303 102 | 7/1974 | Germany . |

*Primary Examiner*—Eric D. Culbreth
*Attorney, Agent, or Firm*—Klaus J. Bach

[57] ABSTRACT

In a support arrangement for a steered vehicle wheel mounted on a wheel carrier which is supported by a transverse link by way of a ball joint with a flange pivotally supported and mounted on the transverse link by clamping screws extending through spaced mounting holes in the transverse link and the mounting flange, the mounting holes in one of the transverse link and mounting flange is formed by at least three different receiving bores disposed at different distances from the pivot point of the flange for receiving the clamping screws and the mounting holes in the other are holes elongated along a line extending through the pivot point between the transverse link and the flange and forming jointly with the screws stops which provide for positive engagement between the transverse link and the flange in each of the different relative pivot positions between the two.

2 Claims, 5 Drawing Sheets

SUPPORT ARRANGEMENT FOR A STEERED VEHICLE WHEEL

BACKGROUND OF THE INVENTION

The invention relates to a support arrangement for a steered vehicle wheel which is supported on a wheel carrier by a transverse link so as to permit the adjustment of the caster of the wheel.

An arrangement of this type is known from German Patent Specification 1278261.

In the arrangement shown therein, the two parts which can be pivoted with respect to one another for the adjustment of the caster are not positively secured against pivoting in their adjustment positions. They are merely fixed with respect to one another by the clamping force of the clamping screws by which the two parts are engaged with each other.

It is the object of the present invention to provide a mounting arrangement for a vehicle wheel with an adjustment means providing definite adjustment positions in which positive engagement is provided for by the wheel mounting members.

SUMMARY OF THE INVENTION

In a support arrangement for a steered vehicle wheel mounted on a wheel carrier which is supported by a transverse link by way of a joint with a flange pivotally supported and mounted on the transverse link by clamping screws extending through spaced mounting holes in the transverse link and the mounting flange, the mounting holes in one of the transverse link and mounting flange comprise at least three different receiving bores for receiving the clamping screws and the mounting holes in the other are holes elongated along a line extending through the pivot point between the transverse link and the flange and forming jointly with the screws stops which provide for positive engagement between the transverse link and the flange in each of the different relative pivot positions between the two.

The mounting holes include a number of predetermined screw-receiving positions corresponding to the number of possible adjustments. This could actually be achieved by an appropriate number of individual bores, to be assigned to one slot, each arranged at the same radial distance, or a different radial distance, from the pivot axis. However, such individual bores would take up a relatively large amount of space. Such a solution however can not be realized in the small amount of space available. The invention thus consists in combining such individual bores in a space-saving manner to form in each case a single, functionally equivalent opening. A more detailed explanation as to how this solution according to the invention can be achieved is given below in conjunction with the description of an exemplary embodiment.

A particular advantage of the invention is that, with small pivot angles and a small amount of space for the screw holes for predetermined pivot positions, it is possible to achieve in each position a good and secure positive engagement in the pivot direction between the screws and the joined parts.

An exemplary embodiment is illustrated below on the basis of the accompanying drawings:

DESCRIPTION OF A PREFERRED EMBODIMENT

Figure 1:
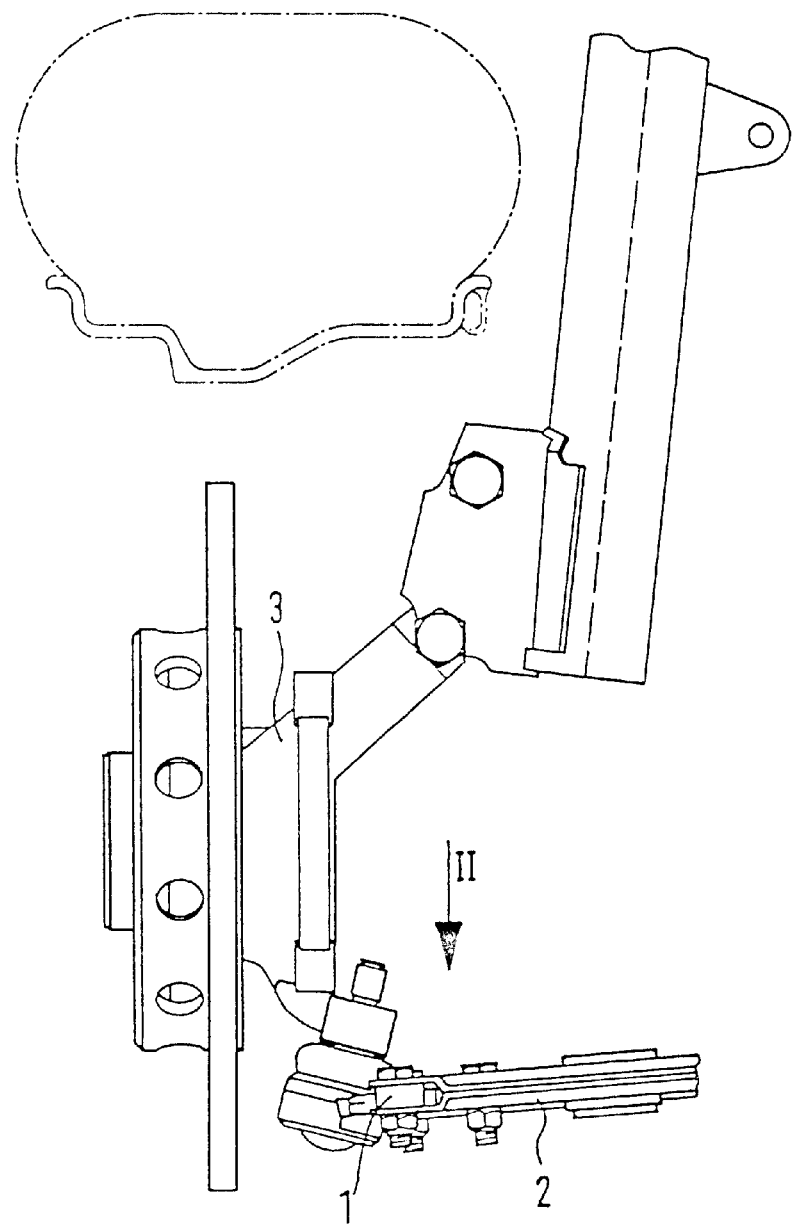
FIG. 1 shows, in the longitudinal direction of a vehicle, a transverse link, which is connected to a wheel carrier of the vehicle.

As shown in FIG. 1, a transverse link 2 is connected pivotably to the flange 1 of a wheel carrier 3 of a motor vehicle.

For the sake of simplicity, the flange 1 and the transverse link 2 are referred to as parts 1 and 2 hereinbelow.

In order to illustrate the concept of the invention, the realization of the shape of the first holes 4 is explained below as follows.

The first holes are located in the first part (flange) 1, which can be pivoted around a pivot axis 5 with respect to the second part (transverse link) 2.

Figure 4:
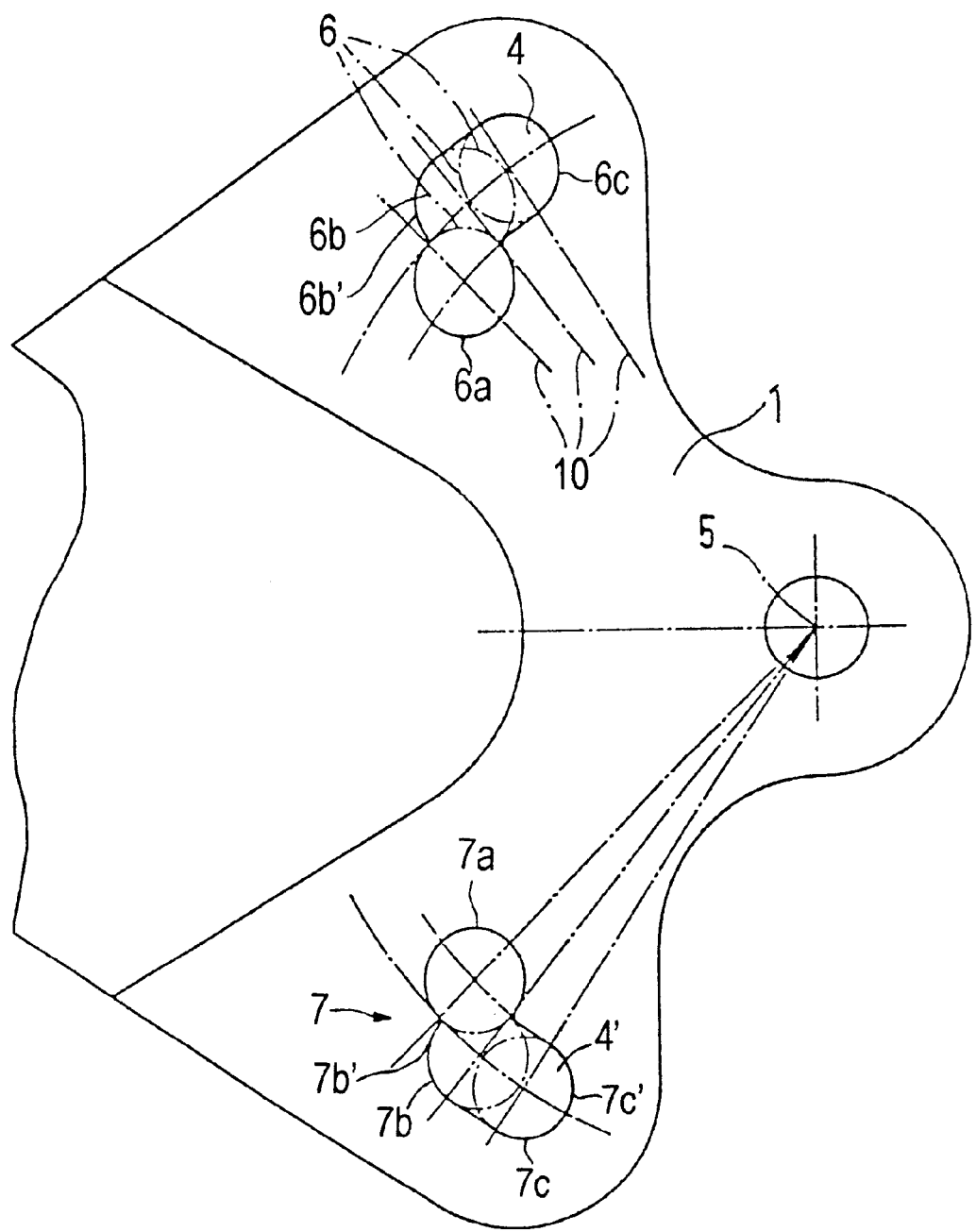
FIG. 4 shows the flange alone.
Figure 5:
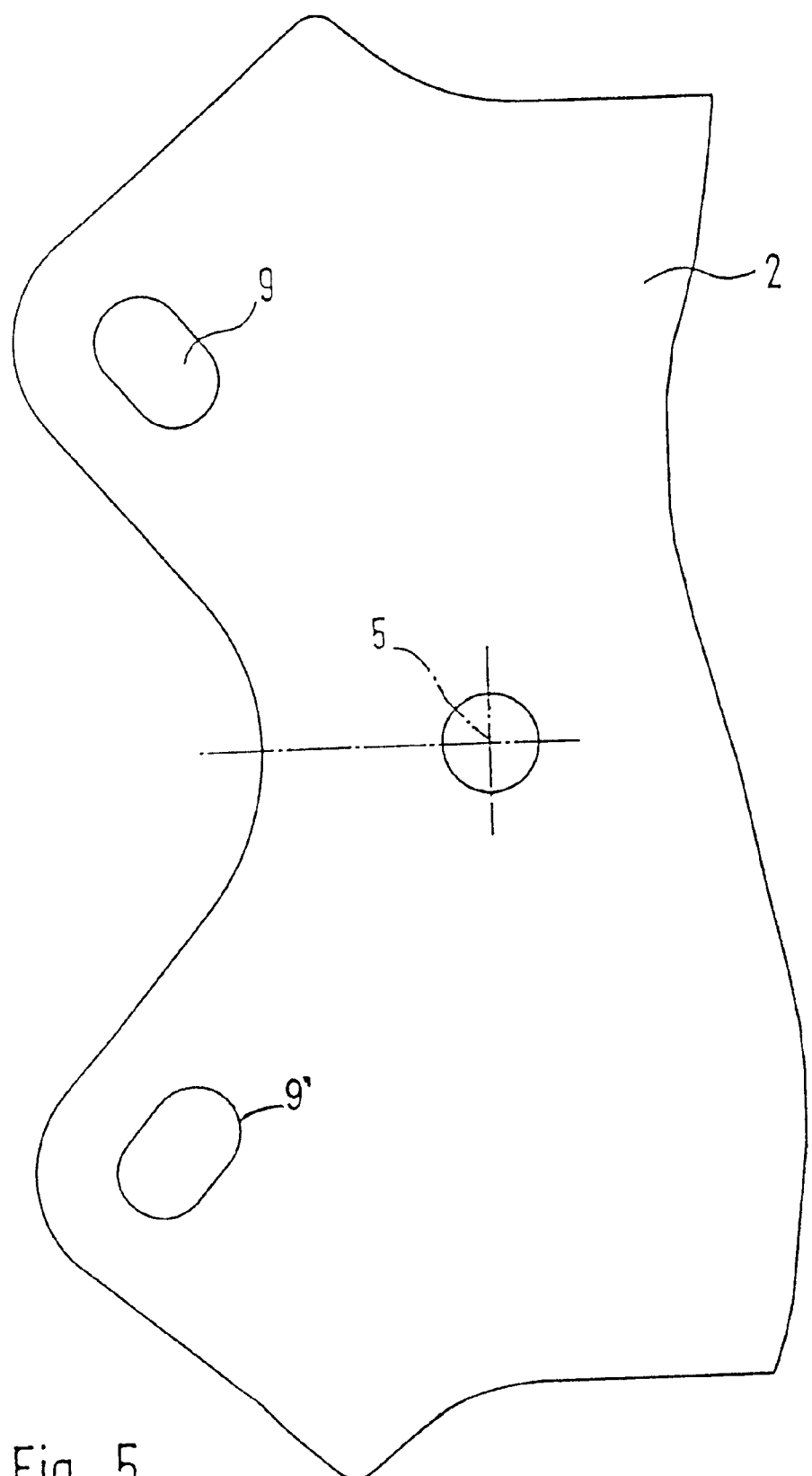
FIG. 5 shows the connection region of the transverse link alone.

The circumference of the first hole 4 is made up of segments of the circumferences of three imaginary bores 6 which are arranged one beside the other so as to overlap, the missing regions of these imaginary bores 6 being indicated in FIG. 4 by dash-dotted lines. If these bores 6 were not overlapping, but rather were each arranged at a sufficient distance apart from one another, with their center points arranged on the lines 10 extending to the pivot axis 5, they would constitute separate bores. In this case, it would be sufficient if, of the two first holes 4, just one would include individual bores 6 of the above-mentioned type, while the other first hole 4' could be of any shape which allows maximum pivoting. This is because a positive engagement would already be provided by the individual bores 6 replacing one of the two first holes 4. However, as it is illustrated in FIG. 4, these individual bores 6 are combined in an overlapping manner to form one first hole 4. In order to connect the two parts 1 and 2 with a positive engagement in both pivot directions, it is therefore necessary for the second first hole 4' to be produced from overlappig bores 7 as well. The circumferences of the first holes 4, 4' are produced from these overlapping bores and are made up of individual segments of these bores 6, 7 such that, together, the two first holes 4, 4' each provide by way of the clamping screws 8 (FIG. 2) for a form-fitting engagement between the two parts 1 and 2 which are pivotable with respect to one another.

Figure 2:
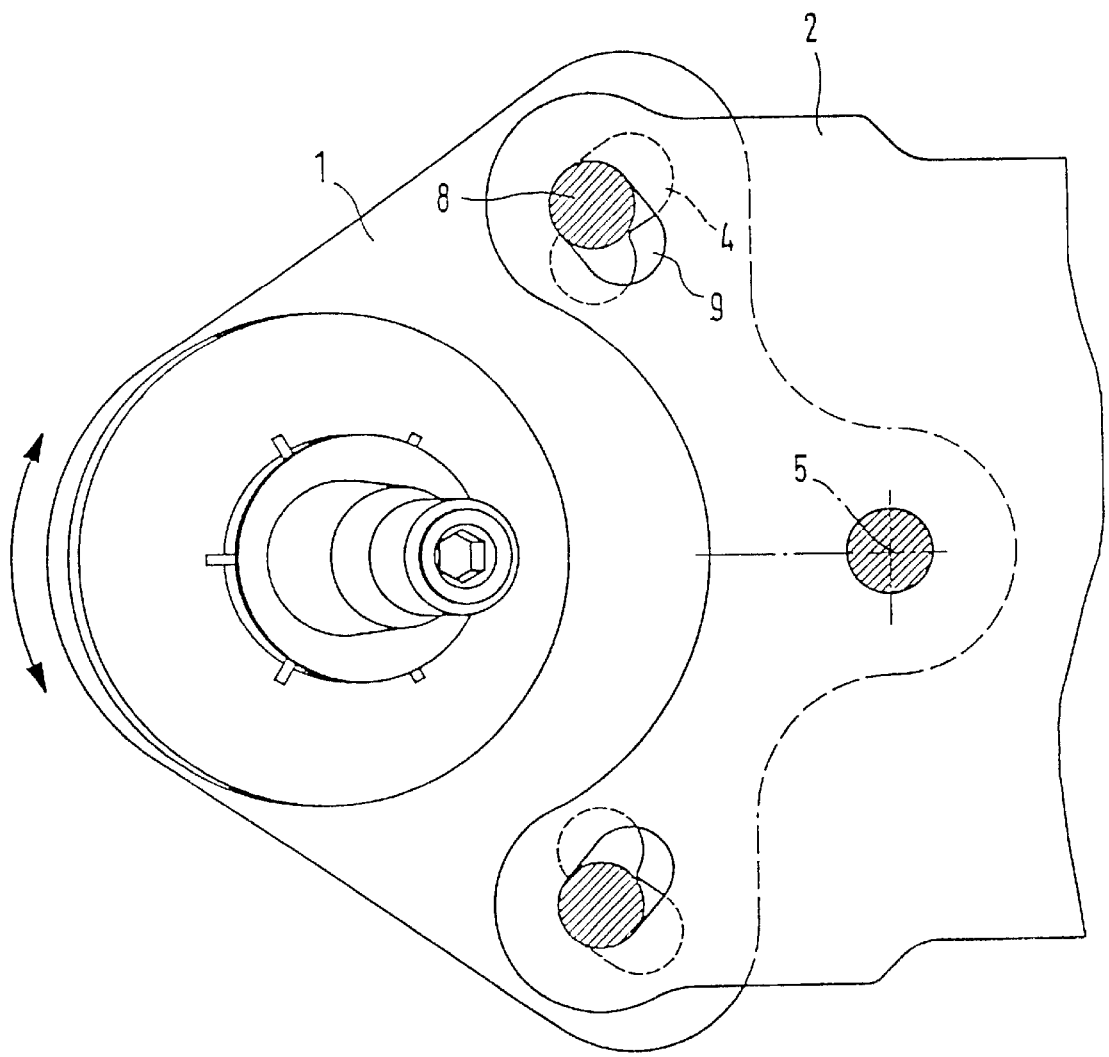
FIG. 2 is a view, in the direction of the arrow II of FIG. 1, of the detail of the adjustment means of a transverse link attached to a flange of a wheel-carrier ball joint, the view showing the flange in a central pivot position with respect to the transverse link to which it is attached.
Figure 3:
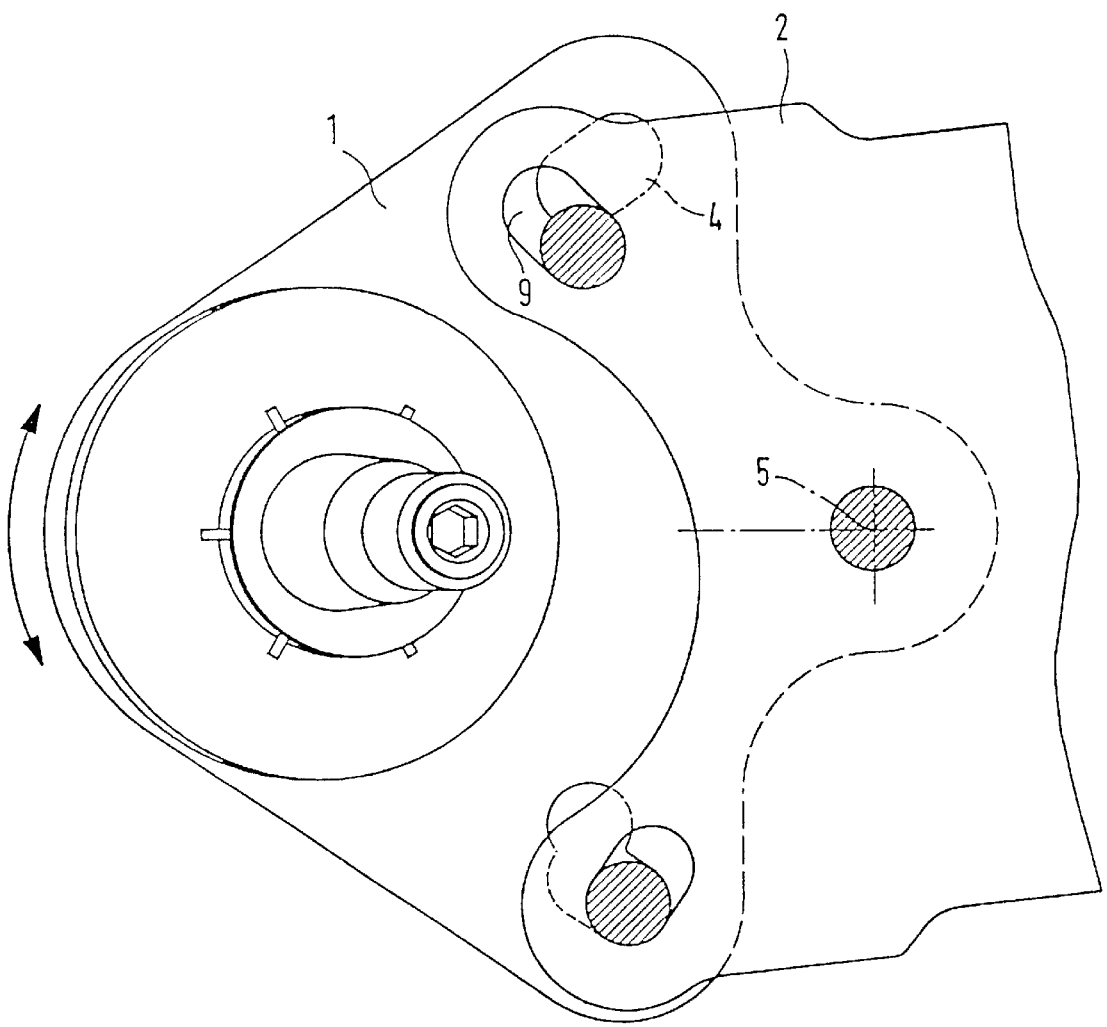
FIG. 3 is a view of the caster-adjustment means according to FIG. 2, showing the transverse link in one of the two possible pivot end positions with respect to the flange to which it is attached.

The diameter of the imaginary bores 6, 7 is matched by the diameter of the clamping screws 8 which are to be used, with the result that, for the predetermined screw positions, the form fit desired in the pivot direction is insured. In the example shown, a total of three pivot positions is provided. Of these positions, FIG. 2 shows the central adjustment position, while FIG. 3 indicates one of the two pivot end positions.

In order to receive a clamping screw 8 in the associated first holes 4, 4' of the first part 1 and the second holes 9, 9' in the second part 2, the second holes have to be formed as slots having long axes which preferably extend through the pivot axis 5. This is illustrated very clearly by the inclusion of the imaginary bores 6 on the rays 10 in FIG. 4.

Preferably, the first holes 4, 4' (mounting holes) of the first part are formed by three different overlapping receiving bores 6a, 6b, 6c and, respectively, 7a, 7b, 7c of which two bores 6b, 6c and 7b, 7c, respectively, are arranged at a first distance from the pivot axis 5 and an adjacent bore 6a and 7a, respectively, arranged at a second distance from the pivot axis 5. The second mounting holes 9 and 9', which extend along a line passing through the pivot axis 5 have a length corresponding to the difference between the first and second distances plus the diameter of the bores. Preferably, the adjacent bores 6a and 7a are closer to the pivot point 5 than the two other bores forming the holes 4, 4'.

Assuming for example, the part 1 and the part 2 are so connected that the screw 8 extends through the bore 6a (FIG. 4) of the hole hole 4 and the hole 9 of the second part 2, the second part 2 is in such a position that a screw extending through the second hole 9' in the second part extends through the bore 7c of the hole 4'. Parts 1 and 2 are then in positive engagement with one another since relative pivoting about the pivot point 5 is prevented by engagement of the one screw in the bore hole 6a and also by engagement of the other screw with the wall portion 7c' of the bore 7c. If the parts 1 and 2 are positioned relative to each other such that the screws extend through the bores 6b and 7b, positive engagement is achieved by engagement of the one screw with the wall portion 6b' preventing relative pivoting in one direction and by engagement of the other bolt with the wall portion 7b' preventing relative pivoting in the other direction.

The particular advantage of the arrangement according to the invention is that adjustment positions can be obtained which, to a large extent, have a form fit in the pivot direction with simple means and which can be accommodated in an extremely small amount of space.

What is claimed is:

1. A support arrangement for a steered vehicle wheel mounted on a wheel carrier which is supported by a transverse link, said wheel carrier having a joint with a flange defining a first part, mounted to said transverse link defining a second part, said first and second parts being supported adjacent one another pivotably about a pivot axis and having angularly spaced mounting hole structures with first and second mounting holes formed in said first and second parts, respectively, and clamping screws extending through said mounting holes for engaging said first and second parts with one another, the first of said mounting holes comprising at least three different overlapping receiving bores two bores, arranged at a first distance from said pivot point and an adjacent bore arranged at a second distance from said pivot point and the second of said mounting holes being elongated along a line extending through said pivot axis and the respective second mounting hole and having a length corresponding to the difference between said first and second distances plus a diameter of said bores, said first and second mounting holes defining jointly stops which, with said clamping screws, provide for positive engagement between said first and second parts in each of the relative pivot positions of said first and second parts as defined by said at least three different receiving bores.

2. A support arrangement according to claim 1, wherein said adjacent bore of each first hole is disposed closer to said pivot point than said two bores arranged at said first distance from said pivot point.

\* \* \* \* \*